United States Patent
Thorne et al.

(10) Patent No.: US 9,774,795 B2
(45) Date of Patent: Sep. 26, 2017

(54) INFRARED DETECTOR SYSTEM AND METHOD

(75) Inventors: Peter Thorne, Basildon (GB); Peter Knowles, Basildon (GB)

(73) Assignee: LEONARDO MW LTD, Essex (GB)

( * ) Notice: Subject to any disclaimer, the term of this patent is extended or adjusted under 35 U.S.C. 154(b) by 0 days.

(21) Appl. No.: 14/118,428

(22) PCT Filed: Jul. 18, 2012

(86) PCT No.: PCT/GB2012/051706
§ 371 (c)(1),
(2), (4) Date: Dec. 12, 2013

(87) PCT Pub. No.: WO2012/156762
PCT Pub. Date: Nov. 22, 2012

(65) Prior Publication Data
US 2014/0091218 A1    Apr. 3, 2014

(30) Foreign Application Priority Data
May 18, 2011    (GB) .................................. 1108353.2

(51) Int. Cl.
*H04N 5/3745* (2011.01)
*H04N 5/33* (2006.01)
(Continued)

(52) U.S. Cl.
CPC ............ *H04N 5/33* (2013.01); *H04N 5/357* (2013.01); *H04N 5/365* (2013.01); *H04N 5/367* (2013.01);
(Continued)

(58) Field of Classification Search
None
See application file for complete search history.

(56) References Cited

U.S. PATENT DOCUMENTS 6,593,562 B1 *  7/2003  Parrish .............. H01L 27/14609
                                                                250/208.1
2002/0005563 A1 *  1/2002  Shu .............................. 257/529
(Continued)

FOREIGN PATENT DOCUMENTS

DE    3733074 A1    4/1989
EP    1143521 A1    10/2001
(Continued)

OTHER PUBLICATIONS

International Search Report (PCT/ISA/210) dated Sep. 25, 2012, by the European Patent Office as the International Searching Authority for International Application No. PCT/GB2012/051706.
(Continued)

*Primary Examiner* — Yara B Green
(74) *Attorney, Agent, or Firm* — Buchanan Ingersoll & Rooney PC

(57) ABSTRACT

An infrared detector system is described which includes a detector diode array 3 and a non volatile memory 1. The non volatile memory 1 can use CMOS Silicon Fuse technology which can be polysilicon devices that are programmed using voltage-current-time profiles suitable for the silicon process technology, such that when applied will cause the polysilicon element to heat up rapidly and melt. This results in the fuse element going open circuit, just like blowing a known fuse. The fuse can act as a logic element that has a one time, user programmable and permanent logic state. An array of such memory cells is can be mapped to a sub pixel diode detector array.

13 Claims, 2 Drawing Sheets

(51) Int. Cl.
*H04N 5/357* (2011.01)
*H04N 5/365* (2011.01)
*H04N 5/367* (2011.01)
*H04N 5/335* (2011.01)

(52) U.S. Cl.
CPC ......... *H04N 5/3651* (2013.01); *H04N 5/3745* (2013.01); *H04N 5/335* (2013.01)

(56) References Cited

U.S. PATENT DOCUMENTS

| | | | |
|---|---|---|---|
| 2002/0101532 A1* | 8/2002 | Takayama | H04N 5/2351 348/362 |
| 2005/0224714 A1* | 10/2005 | Akin et al. | 250/332 |
| 2006/0083095 A1 | 4/2006 | Kim et al. | |
| 2007/0165443 A1* | 7/2007 | Richardson | H04N 5/378 365/105 |
| 2007/0297811 A1* | 12/2007 | Reinhardt | H04B 10/1149 398/202 |
| 2008/0049125 A1* | 2/2008 | Subbotin | H04N 5/367 348/241 |
| 2008/0218610 A1 | 9/2008 | Chapman et al. | |
| 2009/0322912 A1* | 12/2009 | Blanquart | H04N 5/2351 348/241 |
| 2010/0141771 A1 | 6/2010 | Hu | |
| 2011/0049374 A1* | 3/2011 | Omi | 250/370.08 |
| 2012/0099005 A1* | 4/2012 | Kali | H04N 5/3572 348/240.99 |
| 2013/0009163 A1* | 1/2013 | Ueda | H01L 27/11521 257/72 |
| 2013/0126742 A1* | 5/2013 | Hayun et al. | 250/366 |
| 2013/0193007 A1* | 8/2013 | Hahn | B65D 77/02 206/204 |

FOREIGN PATENT DOCUMENTS

| | | |
|---|---|---|
| EP | 2172973 A1 | 4/2010 |
| WO | WO 2007/036055 A1 | 4/2007 |

OTHER PUBLICATIONS

Written Opinion (PCT/ISA/237) dated Sep. 25, 2012, by the European Patent Office as the International Searching Authority for International Application No. PCT/GB2012/051706.

Jun Yin et al., A System-on-Chip EPC Gen-2 Passive UHF RFID Tag with Embedded Temperature Sensor, IEEE Journal of Solid-State Circuits, vol. 45, No. 11, Nov. 2010, pp. 2404-2420.

Yin, Jun et al., "A System-on-Chip EPC Gen-2 Passive UHF RFID Tag With Embedded Temperature Sensor" IEEE Journal of Solid-State Circuits, vol. 45, No. 11 Nov. 2010, pp. 2404-2420.

* cited by examiner

INFRARED DETECTOR SYSTEM AND METHOD

FIELD

This invention relates to an infrared (IR) detector system and method. More specifically, but not exclusively, it relates to an IR detector system equipped with Silicon Fuse technology as non-volatile memory to configure and control detector diode element array size, macro pixel structure and element deselection.

BACKGROUND

It is a problem that the performance of large area photodiodes can be influenced by localised defects arising from the growth of their semiconductor materials or from their manufacturing process. This problem affects, but is not limited to, photodiodes in the semiconductor mercury cadmium telluride (MCT), in which damage sites in the semiconductor crystal lattice exhibit electrical conductivity. Consequently any damage site that coincides with the p-n junction of a photodiode creates an electrical leakage path in parallel with the p-n junction that is associated with excess electrical current and noise in operation of the photodiode.

Although damage sites (defects) can be microscopic in size, their influence may have a major detrimental effect on the photodiode performance. This invention describes a method of suppressing the influence of defects while adding a minimum of complexity to the operational parameters of the photodiode.

In conventional imaging arrays, each pixel in a matrix of pixels is connected to a readout circuit that performs time division multiplexing of electrical signals from the pixels and exports the signals via one or more output channels. In imaging arrays formed, for example, in MCT, the matrix of MCT pixels is often attached to the readout circuit by indium bump bonding and the readout circuit is in the form of a silicon chip.

It is also a problem that where infra-red imaging photo detector arrays using CMOS Readout IC (ROIC) technology are configured using a subpixel architecture configured under memory control, the memory is usually volatile which therefore requires programming each time the device is powered and used. Sub pixels are unit diode detector elements that are connected to form larger equivalent detector elements at e.g. pixel or macro pixel level. Memory is used to configure array parameters for example the array size, detection area or acuity or to configure macro pixels or to deselect defective detector elements to improve operability, uniformity or yield, either individually or in combination. The memory connects to transistors that control the operation and/or interconnection the sub pixel detector elements. Writing data to the memory operates the transistors to control the array configuration and operation. Such approaches of the prior art are often used due to the simplicity and robustness of memory technology, availability of a suitable programming interface in the host electronics and to support a through life user programming function to retain flexibility in configuring the sub pixel array.

For detector systems that require a sub pixel architecture but do not require reconfiguration through life, this approach then requires the hosts electronics system to provide a memory programming interface to configure the detector array each time the device is powered up and used. This adds cost, complexity, size weight and power to the host electronics system.

For applications using a conventional Photo Conductor (PC) detector, the use of an alternative silicon ROIC is usually impractical or economic; PC technology usually operates is a two terminal device that provides a compact detector with a very simple user interface. Using a conventional photovoltaic (PV) detector approach invariably uses a silicon substrate to fabricate the detector diode array that also has associated micro circuits to provide control functions for the detector diode array.

The features of a conventional imaging array, a large area photo-diode may be produced. Following the example of MCT, an array of multiple small pixels is indium bump bonded to a silicon circuit that can combine in parallel the signals from an arbitrary set of the whole pixel array by externally configuring the readout chip to select the pixels of interest. Large area diodes are simulated by selecting one or more blocks of contiguous pixels, combining the individual signals within the block together, and exporting the combined signals off the readout chip.

This technology becomes useful and economic for larger arrays where the silicon embodies the widely known ROIC to configure and control a large detector array having a user control and programming interface and usually active circuitry to process detector photo currents into usable signal voltages for each detector element. It will be appreciated that such PV technology is more complex for the end user as it requires programming at each power up and use, has signal processing circuits that dissipate significant electrical power and has a more complex user interface. Devices are physically larger, cost more to design, fabricate, and test and to encapsulate.

In addition, the readout chip can be configured to select all the pixels of the array singly, and to process and output their signals, by which means an assessment of each individual pixel can be made to determine its diode characteristics and its electrical noise, and to classify the pixel as normal or defective. By this means defective pixels can be deselected from the blocks that define a large area diode and the performance of the large area diode can be optimised by selecting only those pixels that make a positive contribution to the overall signal to noise ratio of the large area diode.

SUMMARY

According to the present invention there is provided an infrared detector system comprising an infrared detector diode array and a non volatile memory portion in which the non volatile memory portion is formed from a CMOS Silicon Fuse device wherein the infrared detector diode array is configurable via the non volatile memory.

According to the invention there is further provided a method of supressing defects in a device comprising a large area photodiode array comprising the steps of mapping an array of memory cells to the diode array, further mapping each memory cell one to one with a sub pixel control switch, and connecting each sub pixel detector diode element to a user connection node such that data in the memory cell controls the switch and the configuration and operation of each such connected sub pixel diode detector in the array thereby allowing defective subpixel detector diode elements to be deselected, such that the deselection data map as retained in non volatile memory reinstates the deselection map each time the device is powered and operated.

The present invention provides a solution that achieves the benefits of the configurable sub pixel array yet retains the simplicity of the user interface by using Silicon Fused Carrier technology. The complexity of the ROIC interface and user memory configuration is replaced by an array of silicon fuses that are configured at device manufacture to permanently configure the sub pixel array as part of the manufacturing test process. Fabricated devices therefore need a much simpler user interface and retain the detector diode element configuration map indefinitely. A pattern of selected pixels, once configured, can be fixed permanently through the use of a non-volatile memory structure in the silicon circuit. By this means the number of external connections necessary for the subsequent operation of the large area diodes is minimised.

BRIEF DESCRIPTION OF THE DRAWINGS

The invention will now be described with reference to the following diagrammatic drawings in which.

DETAILED DESCRIPTION

Figure 1:
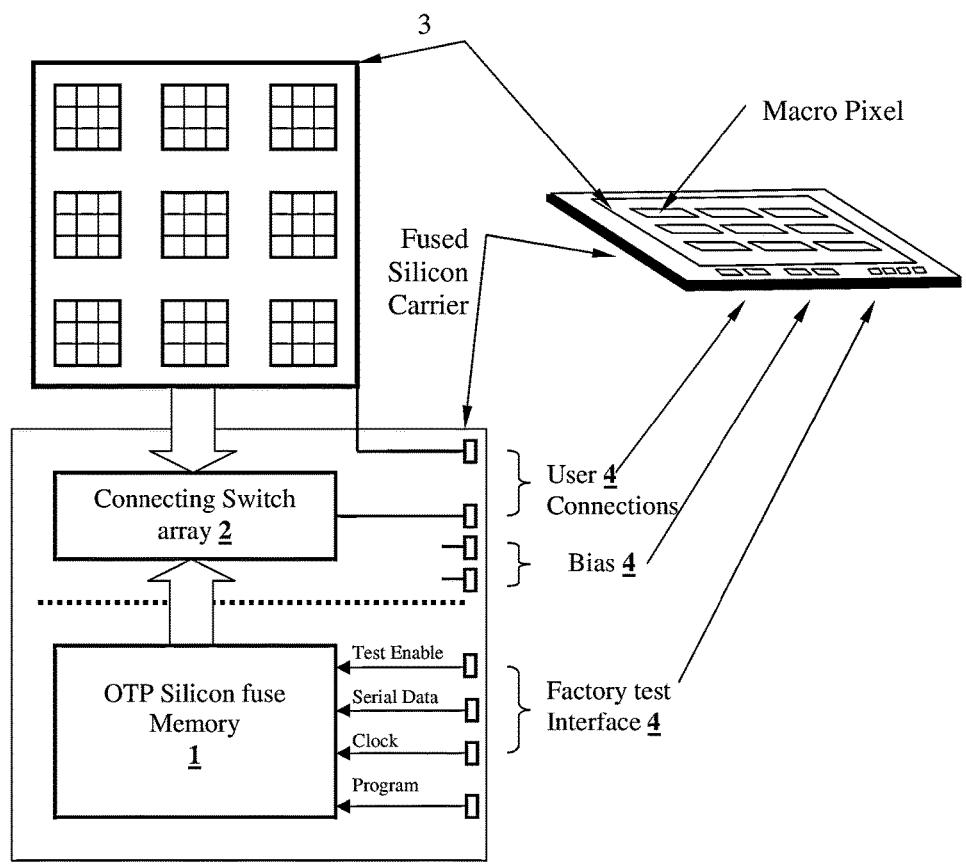
FIG. 1 is a diagrammatic drawing of one form of the Silicon Fused Carrier (SFC) architecture showing an MCT infrared detector diode array hybridised to Silicon circuits containing a connecting switch array under memory control to simplify the user interface. An example array of 3×3 macro pixels is shown where each is formed from 9 sub pixels.

The SFC as described with reference to the present invention can be implemented using a standard silicon CMOS silicon process. These are widely available and the technology is well understood. The SFC architecture is shown in FIG. 1. The main circuit elements are memory circuits 1 that connect to controls 2 switched to configure the detector array 3 and/or to de-select defective sub-pixels from the pixel or macro pixels structures. The memory 1 is non-volatile and often called One-Time-Programmable (OTP) memory.

In one particular embodiment of the memory 1 Silicon Fused memory cells are used. These are usually formed from a polysilicon device that is programmed, using a voltage-current-time profile suitable for the silicon process technology, such that when applied will cause the polysilicon element to heat up rapidly and melt. This results in the fuse element becoming open circuit, in a similar way to a conventional fuse blowing. This is an irreversible operation that may be to set data into the fuse which realises the OTP memory function. Other forms of fuse are equally as valid and are widely available as components in silicon foundry CMOS processes. The Silicon Fused embodiments are also referred to as anti-fuse as the desired function is achieved by blowing the fuse. The nomenclature used in no way limits scope or function of this innovation.

Howsoever implemented, the fuse acts as a logic element that has a one-time user programmable and permanent logic state i.e. one-time-programmable memory. An array of such memory cells may be mapped to a sub pixel diode detector array. Each such memory cell is mapped one to one with a sub pixel control switch that connects each sub pixel detector diode element to a user connection node. Data in the memory cell can therefore control the switch and therefore the configuration and operation of each such connected sub pixel diode detector in the array.

In this way, the user need only access terminals that are internally connected by the memory mapping to the configured sub pixel detector diode array. A simple bias voltage is required to operate the memory. Using CMOS technology results in near zero power dissipation of the Silicon Fused Carrier memory.

The OTP memory is permanently configured as part of the factory manufacturing cycle where the best detector array performance is determined by test and measurement and the configuration is then programmed into the memory. When the detector is used, the memory is biased and the array configuration is applied without the need to re-program the memory.

The SFC is fabricated by instancing the memory and sub pixel detector diode control switches under the detector diode array to provide a compact circuit arrangement and to minimise overall detector size.

The silicon substrate provides the electrical connections 4 to the macropixels as illustrated in FIG. 1. In this example, a macro pixel 3 is a small group of sub pixels that are connected together to form a larger equivalent detector structure. The substrate also provides connections 4 to operate the device during factory test and measurement and to configure the memory.

Figure 2:
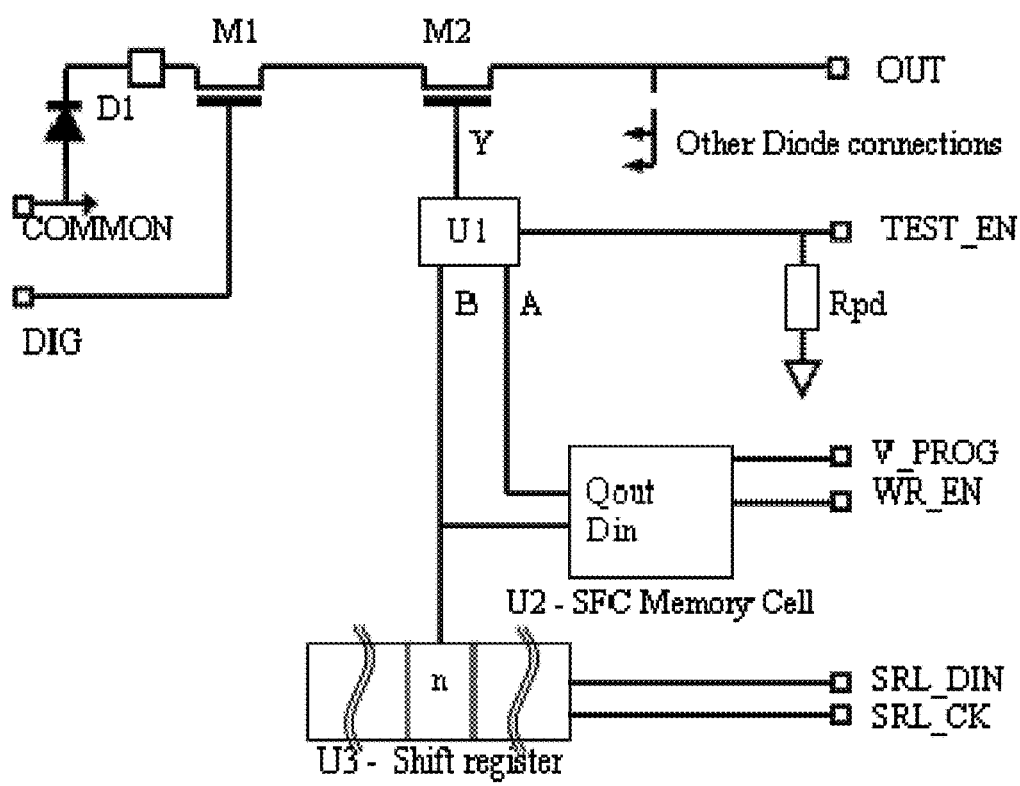
FIG. 2 is a schematic of one form of circuit diagram for the present invention wherein one diode is shown as one element of a plurality of such a number of detector diodes, it should be noted that power supply bias connections are omitted for clarity.

An example electrical schematic of the SFC concept is shown in FIG. 2. The circuit can be seen to be of Direct Injection type which has been used for simplicity and discussion purposes only. It will be appreciated that the SFC concept is in no way limited to this circuit configuration and is equally applicable to all other detector diode and electrical circuit configurations. Detector diode D1 is shown as one element of a plurality of such detector elements formed into an array of such detector diodes. Each detector diode element is mapped to a Silicon Fused memory cell that can control the diode operation by means of transistor switches. In this example, a test override function is shown to illustrate how a parallel means of controlling the diode to assess its performance can be realised. The form of the shift register is not important and other means of providing an equivalent test function are equally as valid.

The circuit operates as follows. Detector diode D1 is connected between the COMMON terminal and transistor M1 source. The voltage applied to the DIG terminal is connected to transistor M1 gate. The diode is therefore biased at the DIG voltage minus the transistor threshold Vt. Transistor M1 drain connects to transistor M2 operating as a switch whereby a high voltage applied to transistor M2 gate will turn the transistor on forming an electrical path to terminal OUT. Transistor M2 gate is driven by U1 operating as a 2 wide AND-OR selector according to the truth table 1. When TEST_EN is retracted LOW then Y=A and transistor M2 gate is controlled by the data in U2 SFC memory cell. When TEST_EN is asserted HIGH then Y=B and transistor M2 gate is controlled by the data in stage 'n' of a shift register U3. The test enable pin is shown with a pull down resistor Rpd such that when this pin is left open circuit, the logic state reverts to the retracted stated ensuring the SFC circuit defaults to the case Y=A and therefore data in the SFC memory cell controls the electrical connection in this case of D1 to the OUT terminal. The data polarity is such that writing a data '1' is used to deselect the diode by retracting the control voltage 'A' which is considered LOW in this example.

TABLE 1

| TEST_EN | Y |
|---|---|
| 0 | A |
| 1 | B |

Serial data is written to the shift register using the standard self-explanatory interface signals Serial Data Clock (SRL_CK) and Serial Data (SRL_DA) to select a detector diode individually or together with others for example for test and measurement purposes. Once evaluated, the data is used to determine an array configuration that may be further evaluated using a composite serial data word. When completed for each detector diode element macro pixel grouping or detector array configuration, the detector diode array configuration or deselection map will have been determined which may then be used to programme the Silicon Fuse memory cells.

Whereas Silicon Fuse memory cell technology is proprietary to each silicon foundries, the specific embodiment is not the subject of this innovation. For a given Silicon Fuse memory cell there will be associated control and interface circuits which are not illustrated here due to the diversity of their embodiment and operation to allow programming and addressing of the target Silicon Fuse memory cell. For discussion purposes, self-explanatory signals are used to illustrate the method that when Write Enable signal (WR_EN) is asserted, data B presented in the shift register (U3) connects to the SFC memory cell data input node (Din) and is written to the Silicon Fused memory cell by asserting the Programming Voltage (V_PROG).

The override control signal (TEST_EN) is used to allow the Silicon Fused memory to be bypassed thereby allowing individual sub-pixel diode elements to be measured individually and in combination to determine and optimise the memory programming data as a factory test function.

It is a feature of the system described that after testing or programming the diode configuration may be further evaluated and further diode de-selections made by re-programming the Silicon Fused Memory using this test function.

It is a further feature of the present system that the diode configuration may be determined and used instead of using the Silicon Fused Memory at any time by asserting the override control signal (TEST_EN) which allows the shift register data directly.

Moreover, the Silicon Fuse memory data generated may be used to deselect a particular detector diode element. In this way, after programming, should a detector element then become defective, it may then be deselected by further programming of the Silicon Fused memory cell.

It will be appreciated that the pixel arrangement shown in FIG. 1 is given to illustrate the principals of SFC technology in forming a particular array configuration and in no way constrains other pixel or macro pixel embodiments for SFC technology.

It will be appreciated that SFC technology can be used to configure the size, format and shape of pixels or macro pixels which is not limited to the format shown in FIG. 1 which is given by way of example only. Other pixel or macro pixel sizes, formats or shapes are equally as valid in application for SFC technology.

It will also be appreciated that the Silicon Fuse memory map may be ignored and the diode configuration set in user preference by just using the volatile memory formed in this case using the shift register (U3).

The invention claimed is:

1. An infrared detector system, comprising:
    an infrared detector diode array;
    a non volatile memory formed from a CMOS Silicon Fuse, wherein the infrared detector diode array is configurable according to a first configuration via the non volatile memory;
    means for measuring sub-pixel diode elements of the diode array;
    a volatile memory device, wherein the infrared detector diode array is configurable according to a second configuration via the volatile memory device;
    a control signal providing means for overriding reading of data from the non-volatile memory such that the infrared detector diode array is configured according to the second configuration of the volatile memory device,
    wherein a user connection node is connected to the control signal providing means, the diode array, and the volatile memory device.

2. A system according to claim 1, comprising:
    a memory bypass having means for testing of sub pixel detector diode elements either individually or in combination.

3. A system according to claim 2, comprising:
    a memory map, said memory map having means to configure size or shape of individual pixels and macro pixel structures.

4. A system according to claim 3, in which the memory map comprises:
    means for improving yield of a single equivalent sized detector element.

5. A system according to claim 4, in which the silicon fuse element comprises:
    means for configuring the infrared detector diode array for user connection to a larger detector array structure of the infrared detection system.

6. A system according to claim 5, comprising:
    a memory data polarity means for retaining user programming or detector diode element deselection functions after initial and any subsequent programming.

7. A system according to claim 1 comprising:
    a memory map, said memory map having means to configure size or shape of individual pixels and macro pixel structures.

8. A system according to claim 7, in which the memory map comprises:
    means for improving yield of a single equivalent sized detector element.

9. A system according to claim 1, in which the silicon fuse element comprises:
    means for configuring the infrared detector diode array for user connection to a larger detector array structure of the infrared detection system.

10. A system according to claim 1, comprising:
    a memory data polarity means for retaining user programming or detector diode element deselection functions after initial and any subsequent programming.

11. A system according to claim 1, wherein means for measuring sub-pixel diode elements includes a data register.

12. A system according to claim 11, wherein the non volatile memory includes an input node that is connected to an output of the data register, such that the non-volatile memory can be programmed with sub-pixel diode element data of the data register.

13. A method of suppressing defects in a device having a photodiode array, the method comprising:
    mapping an array of memory cells to the photodiode array;

further mapping each memory cell one to one with a sub pixel control switch;

connecting each sub pixel detector diode element to a user connection node such that data in a memory cell of the memory cell array controls a switch, and a first detector diode array configuration and operation of each such connected sub pixel diode detector in the memory cell array, such that a first deselection data map retained in non volatile memory reinstates the deselection map each time the device is powered and operated; and generating a control signal that overrides the data in the memory cell to control a second memory device storing second deselection data to configure at least a plurality of sub pixel control switches according to a second detector diode array configuration.

\* \* \* \* \*